US012632779B2

(12) United States Patent
Belakaria et al.

(10) Patent No.: US 12,632,779 B2
(45) Date of Patent: May 19, 2026

(54) HYPERPARAMETER SELECTION USING BUDGET-AWARE BAYESIAN OPTIMIZATION

(71) Applicant: Microsoft Technology Licensing, LLC, Redmond, WA (US)

(72) Inventors: Syrine Belakaria, Pullman, WA (US); Rishit Sheth, Arlington, MA (US); Nicolo Fusi, Watertown, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1078 days.

(21) Appl. No.: 17/551,475

(22) Filed: Dec. 15, 2021

(65) Prior Publication Data

US 2023/0186150 A1     Jun. 15, 2023

(51) Int. Cl.
| | |
|---|---|
| *G06N 20/00* | (2019.01) |
| *G06N 3/0985* | (2023.01) |
| *G06N 5/01* | (2023.01) |
| *G06N 7/01* | (2023.01) |
| *G06N 20/10* | (2019.01) |

(52) U.S. Cl.
CPC .............. *G06N 20/00* (2019.01); *G06N 7/01* (2023.01)

(58) Field of Classification Search
CPC .......... G06N 20/00; G06N 7/01; G06N 20/10; G06N 5/01; G06N 3/0985; G06N 3/08
See application file for complete search history.

(56) References Cited

U.S. PATENT DOCUMENTS

| | | | | |
|---|---|---|---|---|
| 10,360,517 | B2 * | 7/2019 | Koch | ........................ G06N 5/01 |
| 10,417,556 | B1 | 9/2019 | Fairbank | |
| 2013/0254196 | A1 | 9/2013 | Babu | |
| 2016/0328655 | A1 * | 11/2016 | Adams | ................... G06N 5/048 |

(Continued)

OTHER PUBLICATIONS

Luong et al., Adaptive cost-aware Bayesian optimization, Knowledge-Based Systems, vol. 232, Sep. 9, 2021, https://doi.org/10.1016/j.knosys.2021.107481 (Year: 2021).*

(Continued)

*Primary Examiner* — Kakali Chaki
*Assistant Examiner* — Molly C Sippel
(74) *Attorney, Agent, or Firm* — Schwegman Lundberg & Woessner, P.A.

(57)     ABSTRACT

Generally discussed herein are devices, systems, and methods for identifying optimal hyperparameter values within a pre-defined budget. A method can include, while training a model for a number of iterations using values of a hyperparameter vector, recording objective function values of the objective function and cost function values of a cost function, fitting a function model to the objective function values and a cost model to the cost function values resulting in a fitted function model and a fitted cost model, selecting a second hyperparameter vector, determining an optimal number of iterations to perform and after which to stop training using the second hyperparameter vector, re-training the model of the type of model for the optimal number of iterations using the second hyperparameter vector, and providing hyperparameter values, of the hyperparameter vector or the second hyperparameter vector, that maximize an objective defined by the objective function.

5 Claims, 6 Drawing Sheets

(56)                References Cited

U.S. PATENT DOCUMENTS

2019/0209022 A1    7/2019  Sobol
2021/0056420 A1*   2/2021  Konishi ................. G06N 3/063

OTHER PUBLICATIONS

Donham et al., Speeding Up Automatic Hyperparameter Optimization of Deep Neural Networks by Extrapolation of Learning Curves, 2015, Proceedings of the Twenty-Fourth International Joint Conference on Artificial Intelligence, pp. 3460-3468, https://www.ijcai.org/Proceedings/15/Papers/487.pdf (Year: 2015).*

Belakaria, et al., "Bayesian Optimization Over Iterative Learners with Structured Responses: A Budget-aware Planning Approach", In Repository of arXiv:2206.12708v1, Jun. 25, 2022, 26 Pages.

Bischl, et al., "Hyperparameter Optimization: Foundations, Algorithms, Best Practices and Open Challenges", In Repository of arXiv:2107.05847v3, Nov. 24, 2021, 70 Pages.

Wang, et al., "Parallel Bayesian Global Optimization of Expensive Functions", In Repository of arXiv:1602.05149v1, Feb. 16, 2016, 25 Pages.

"International Search Report and Written Opinion Issued in PCT Application No. PCT/US22/049470", Mailed Date: Mar. 17, 2023, 12 Pages.

Ariafar, et al., "Faster & more reliable tuning of neural networks: Bayesian optimization with importance sampling", In The 24th International Conference on Artificial Intelligence and Statistics, Mar. 18, 2021, pp. 1-19.

Carpentier, et al., "Simple regret for infinitely many armed bandits", In International Conference on Machine Learning, Jun. 1, 2015, 9 Pages.

Dai, et al., "Bayesian optimization meets bayesian optimal stopping", In International Conference on Machine Learning, May 24, 2019, 11 Pages.

Domhan, et al., "Speeding up automatic hyperparameter optimization of deep neural networks by extrapolation of learning curves", In Proceedings of Twenty-fourth international joint conference on artificial intelligence, Jun. 27, 2015, pp. 3460-3468.

Erickson, et al., "Autogluon-tabular: Robust and accurate automl for structured data.", In Repository of arXiv:2003.06505v1, Mar. 13, 2020, 28 Pages.

Falkner, et al., "Bohb: Robust and efficient hyperparameter optimization at scale", In Proceedings of the 35 th International Conference on Machine Learning, Jul. 3, 2018, 10 Pages.

Feurer, et al., "Auto-sklearn: efficient and robust automated machine learning.", In Automated Machine Learning, 2019, 223 Pages.

Frazier, et al., "A knowledge-gradient policy for sequential information collection", In SIAM Journal on Control and Optimization, vol. 47, Issue 5, Apr. 10, 2008, 44 Pages.

Gabillon, et al., "Best arm identification: A unified approach to fixed budget and fixed confidence", In Proceedings of NIPS—Twenty-Sixth Annual Conference on Neural Information Processing Systems., Dec. 2012, 17 Pages.

Gonzalez, et al. "Batch bayesian optimization via local penalization", In Artificial intelligence and statistics, May 2, 2016, pp. 648-657.

Gonzalez, et al., "Glasses: Relieving the myopia of bayesian optimisation", In Artificial Intelligence and Statistics, May 2, 2016, pp. 790-799.

Hoffman, et al., "On correlation and budget constraints in model-based bandit optimization with application to automatic machine learning.", In Journal of Artificial Intelligence and Statistics, Apr. 2, 2014, pp. 365-374.

Jamieson, et al., "Non-stochastic Best Arm Identification and Hyperparameter Optimization", In Proceedings of the 19th International Conference on Artificial Intelligence and Statistics, May 2, 2016, pp. 240-248.

Jiang, et al., "Binoculars for Efficient, Nonmyopic Sequential Experimental Design", In Proceedings of the 37 th International Conference on Machine Learning, Nov. 21, 2020, 10 Pages.

Kandasamy, et al., "Multi-fidelity bayesian optimisation with continuous approximations", In International Conference on Machine Learning, Jul. 17, 2017, 10 Pages.

Katharopoulos, et al., "Not all samples are created equal: Deep learning with importance sampling", In International conference on machine learning, Jul. 3, 2018, 10 Pages.

Klein, et al., "Fast bayesian optimization of machine learning hyperparameters on large datasets", In Proceedings of the 20th International Conference on Artificial Intelligence and Statistics, Apr. 20, 2017, 09 Pages.

Lam, et al. "Bayesian optimization with a finite budget: An approximate dynamic programming approach", In Journal of Advances in Neural Information Processing Systems , vol. 29, Dec. 5, 2016, 9 Pages.

Ledell, et al., "H2o autorl: Scalable automatic machine learning", In Proceedings of the AutoML Workshop at ICML, Jul. 18, 2020, pp. 1-16.

Lee, et al., "A Nonmyopic Approach to Cost-Constrained Bayesian Optimization", In Repository of arXiv:2106.06079v1, Jun. 10, 2021, 11 Pages.

Lee, et al., "Cost-aware Bayesian Optimization", In Repository of arXiv:2003.10870v1, Mar. 22, 2020, 12 Pages.

Lee, et al., "Efficient rollout strategies for bayesian optimization", In Conference on Uncertainty in Artificial Intelligence, Aug. 27, 2020, pp. 260-269.

Lu, et al., "Hyper-parameter Tuning under a Budget Constraint", In Repository of arXiv:1902.00532v1, Feb. 1, 2019, pp. 1-19.

Nguyen, et al., "Bayesian Optimization for Iterative Learning", In Repository of arXiv:1909.09593v1, Sep. 20, 2019, 16 Pages.

Olson, et al., "Tpot: A tree-based pipeline optimization tool for automating machine learning", In JMLR: Workshop and Conference Proceedings, Dec. 4, 2016, pp. 66-74.

Osborne, Michael, "Bayesian Gaussian processes for sequential prediction, optimisation and quadrature", In Thesis of University of Oxford, 2010, 244 Pages.

Picheny, et al., "A nonstationary space-time gaussian process model for partially converged simulations", In SIAM/ASA Journal on Uncertainty Quantification, vol. 1, Issue 1, 2013, pp. 57-78.

Sabharwal, et al., "Selecting near-optimal learners via incre-mental data allocation", In Proceedings of Thirtieth AAAI Conference on Artificial Intelligence, Mar. 2, 2016, pp. 2007-2015.

Sheth, et al., "Probabilistic Matrix Factorization for Automated Machine Learning", In Proceedings of Conference on Neural Information Processing Systems, 2018, pp. 1-10.

Srinivas, et al., "Gaussian Process Bandits without Regret: An Experimental Design Approach", In Repository of arXiv:0912.3995v1, Dec. 21, 2009, pp. 1-17.

Swersky, et al., "Freeze-thaw bayesian optimization.", In Repository of arXiv:1406.3896v1, Jun. 16, 2014, pp. 1-12.

Swersky, et al., "Multi-task bayesian optimization", In Journal of Neural Information Processing Systems, Dec. 5, 2013, 10 Pages.

Thornton, et al., "Auto-weka: Combined selection and hyperparameter optimization of classification algorithms", In Proceedings of the 19th ACM SIGKDD international conference on Knowledge discovery and data mining, Aug. 11, 2013, pp. 847-855.

Wilson, et al., "Maximizing acquisition functions for bayesian optimization", In Journal of Advances in Neural Information Processing Systems, Dec. 3, 2018, 18 Pages.

Wu, et al., "Practical Multi-fidelity Bayesian Optimization for Hyperparameter Tuning", In Uncertainty in Artificial Intelligence, Aug. 6, 2020, 11 Pages.

Yue, et al., "Why non-myopic bayesian optimization is promising and how far should we look-ahead a study via rollout.", In International Conference on Artificial Intelligence and Statistics, Jun. 3, 2020, 10 Pages.

Audibert, et al., "Best Arm Identification in Multi-Armed Bandits", In The 23rd Annual Conference on Learning Theory, Retrieved from URL: https://www.learningtheory.org/colt2010/, Jun. 2010, 13 Pages.

Li, et al., "Hyperband: A Novel Bandit-Based Approach to Hyperparameter Optimization", In Journal of Machine Learning Research, vol. 18, Apr. 2018, pp. 1-52.

(56)         References Cited

OTHER PUBLICATIONS

Examination Report Received in Indian Patent Application No. 202417044239, mailed on Dec. 10, 2025, 06 pages.

* cited by examiner

HYPERPARAMETER SELECTION USING BUDGET-AWARE BAYESIAN OPTIMIZATION

BACKGROUND

Hyperparameter optimization of machine learning (ML) algorithms, and more generally ML pipelines, focuses on automatic tuning of parameters which affect model selection and/or model training. A variety of approaches for pipelines based on classical ML models have been developed utilizing Bayesian optimization, meta-learning, and ensembling. While the inclusion of neural networks (NNs) as pipeline choices occurs to some extent in existing frameworks, NNs are complex architectures that consume more computing resources for training than their classical ML counterparts and can benefit from cost modeling and budget management extensions to the standard pipeline selection problem.

SUMMARY

A device, system, method, and computer-readable medium configured for improved hyperparameter selection for an iterative learning model are provided. The hyperparameter selection improves upon prior selection techniques by, for example, identifying a time (a number of iterations) at which further training will not substantially improve model performance. Then, the model is trained, and the identified time is updated based on the training. As the model performance plateaus, the model training can be halted and a next set of hyperparameters can be selected and used for training. This allows less time to be spent training when there is only a small likelihood that the training will further improve the accuracy of the model greater than a threshold amount.

A method for providing budget-constrained hyperparameter values for an iterative learning model can include receiving, by a compute device, data indicating a type of iterative learning model, training samples, an objective function, a maximum number of iterations, and a budget. While training a model of the type for a number of iterations using respective values of a hyperparameter vector, objective function values of the objective function and cost function values of a cost function can be recorded. The hyperparameter vector includes a hyperparameter value for each hyperparameter. The method can include fitting a function model to the objective function values and a cost model to the cost function values resulting in a fitted function model and a fitted cost model. The method can include selecting a second hyperparameter vector based on the fitted cost model, the fitted function model, and the budget. The method can include determining, based on the fitted function model and the maximum number of iterations, an optimal number of iterations to perform and after which to stop training using the second hyperparameter vector. The method can include re-training the model of the type of model for the optimal number of iterations using the second hyperparameter vector. The method can include providing hyperparameter values, of the hyperparameter vector or the second hyperparameter vector, that maximize an objective defined by the objective function.

The method can include, while training the model for the optimal number of iterations using the second hyperparameter vector, updating the optimal number of iterations based on the recorded objective function values and the recorded cost function values. The method can include comparing a current objective function value provided by evaluating the objective function model at (i) the second hyperparameter and (ii) the updated optimal number of iterations to a current best value for the objective function. The method can include stopping the training if the current objective function value is less than the current best value or continuing training with more iterations if the current objective function value is greater than (or equal to) the current best value.

Determining optimal number of iterations can include finding a minimum number of iterations at which a difference between (i) the fitted function model evaluated at the second hyperparameter vector and the maximum number of iterations and (ii) the fitted function model at the second hyperparameter vector and a number of iterations is less than a specified threshold value. Selecting the second hyperparameter vector can include determining, based on the maximum number of iterations, an expected utility of hyperparameters in a neighborhood of the hyperparameter vector in hyperparameter space. Selecting the second hyperparameter vector can include providing a hyperparameter vector corresponding to a highest expected utility as the second hyperparameter vector.

The method can further include selecting a sequence of hyperparameter vectors, wherein selecting the second hyperparameter vector is part of selecting the sequence of hyperparameter vectors. The method can further include selecting the second hyperparameter vector of the sequence of hyperparameter vectors based on determining the second hyperparameter vector (i) has a highest expected immediate reward for evaluating the hyperparameter vector, (ii) has a highest reward per unit cost for evaluating the hyperparameter vector, or (iii) is a randomly selected hyperparameter vector. The method can further include, before fitting a function model to the objective function values and a cost model to the cost function values resulting in a fitted function model and a fitted cost model, pruning the objective function values and the cost function values by one of (i) selecting equally spaced points, (ii) selecting points with highest uncertainty, or (iii) selecting points for which the difference between the objective function evaluated at those points is greatest. Systems, devices, and computer-readable mediums can be configured to perform the method.

DETAILED DESCRIPTION

Figure 1:
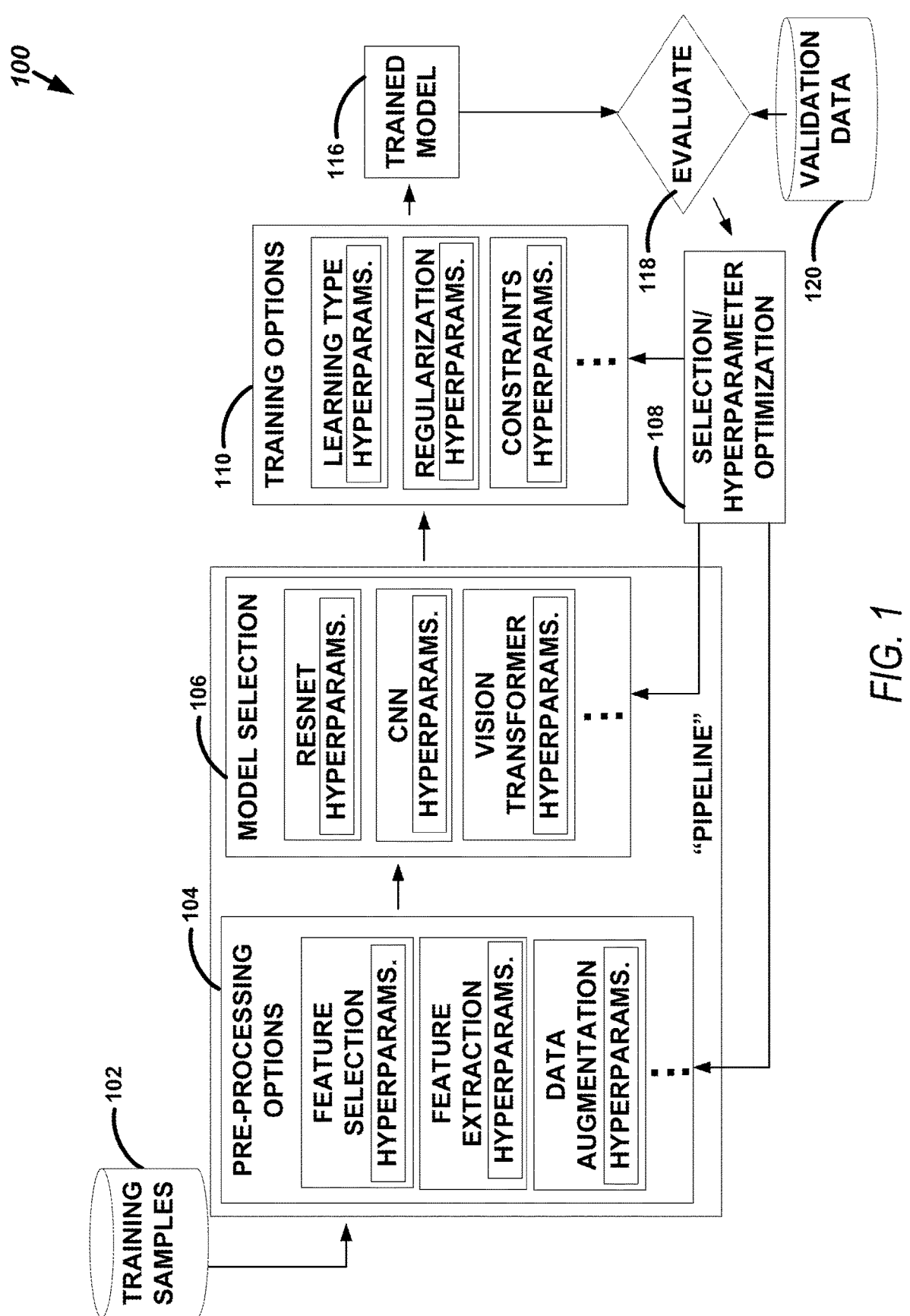
FIG. 1 illustrates, by way of example, a conceptual block diagram of an embodiment of a technique for ML model generation.

Model selection can include selecting a statistical model from a set of models. The model selection can choose the type of model. The type of model defines, at least in part, hyperparameters that are associated with the model. Hyperparameters are parameters whose value is used to control the learning process. By contrast, the values of other parameters (e.g., node weights, or the like) are derived via training. Hyperparameters are not inferred while fitting the model to the training samples.

ML model pipelines represent a data-preprocessing stage and ML model. Embodiments regard improvements to hyperparameter selection, whether part of the data pre-processing stage or ML model or training Embodiments provide budget-aware hyperparameter optimization that considers an optimal number of epochs to train (less than or equal to a maximum number of epochs) and terminates training when model learning slows below a specified criterion. Embodiments consider estimated cost (modeled by a Gaussian process for example) and estimated objective (modeled by a Gaussian process for example) in selecting a next hyperparameter value to be tested. This selection provides hyperparameter values that are more likely to improve model performance than other selection methods. Other improvements and advantages will be understood with the teaching of this disclosure.

Embodiments are applicable to iterative learners. Iterative learners are models that are trained across multiple epochs. An iterative learning model evolves towards its final state. Embodiments consider a fixed compute budget, iterative learning training scenario. In an embodiment, the fixed compute budget is defined in terms of compute bandwidth consumed, time, memory resources consumed, wall time elapsed, training epochs, a combination thereof, or the like. A configuration is a set of hyperparameter values. In one example, a single configuration within the fixed-budget is selected from a large number of possible configurations. Embodiments provide a strategy that intelligently balances resources spent assessing a single configuration (for what its likely fully-trained performance is projected to be) against resources spent further exploring different configurations.

Embodiments, in short, regard budget-aware learning. Pseudocode for budget-aware, iterative learning is provided:

Budget aware, iterative learning is described using pseudocode:

```
Input: D = {(xᵢ, bᵢ, f(xᵢ, bᵢ))}ᵢ₌₁^Ninitial, {a_query( ), a_stop( ), a_suggest( )}
Output: x̂, B_remaining
B_remaining ← B_total − Σᵢ₌₁^Ninitial bᵢ  //update budget after initial sampling//
while B_remaining do
    if a_stop(D, B_remaining)then  //If model operation meets criterion,
    then stop//
        Break
    Else
        (x, b) = a_query(D, B_remaining)  //select next hyperparameter
        value//
        D ← D ∪ {(x, b, f(x, b))}  //update sampled data//
        B_remaining ← B_remaining − b  //update budget//
x̂ = a_suggest(D, B_remaining)  //identify best hyperparameter value//
Return x̂, B_remaining
```

Hyperparameter optimization includes designing procedures ($a_{query}( )$, $a_{stop}( )$, $a_{suggest}( )$) that result in high average performance across scenarios of different sets of iterative learners and datasets. The unknown "black-box" function $f$: $\chi \times B \mapsto \mathbb{R}$ performs evaluation of a configuration $x \in \chi$ with budget $b \in B$. It can be assumed that this function is non-decreasing in the budget variable.

Embodiments wrap standard Bayesian optimization over configuration space in a layer of budget-aware planning. As described in related works, other approaches based on Bayesian optimization also perform cost modeling of learners, but only implicitly in weighting the acquisition values associated in selecting the next configuration to test. This weighting approach suffers from a known pathology which is addressed by "lifting" the cost modeling aspect into a planning framework. In doing so, the approach of embodiments also decouples the performance response, $f$, from the cost, $c$, response thereby avoiding potential calibration issues.

Budget-aware algorithms can be broadly defined as those performing decision-making in the presence of a finite horizon, or fixed total budget, where the performance criterion is to output the best selection. Cost-aware approaches are defined as those that model the cost of querying (e.g., iterative learner performance). Typically, cost-aware approaches involve learning based on cheaper proxies to the objective function (e.g., multi-task learning), or focusing budget on promising candidates by (e.g., learning curve extrapolation). Although, these latter approaches essentially assume an infinite horizon for decision-making, they can be considered implicit budget-aware approaches.

FIG. 1 illustrates, by way of example, a conceptual block diagram of an embodiment of a technique 100 for ML model 116 generation. To generate the ML model 116, training samples 102 can be obtained. Training samples are data for which a classification is known. The training samples are sometimes called input/output samples. A given sample can be associated with a label that indicates the classification of the ML model 116.

The training samples 102 can be pre-processed at operation 104. The operation 104 can include feature selection, feature extraction, data augmentation, normalization, or the like. Feature selection can include selecting a subset of relevant features (e.g., variables, predictors) of the training samples 102 to be used in model construction. Feature selection can identify and retain features that are not redundant or irrelevant. There are many techniques for feature selection. Feature extraction creates new features from functions of the original features. There are many techniques for feature extraction. Data augmentation includes techniques for increasing the amount of data by adding modified copies of already existing data or newly created synthetic data from existing data. Data augmentation acts as a regularizer and helps reduce overfitting when training the ML model. There are many techniques for data augmentation. One or more pre-processing techniques can include hyperparameters for which values are to be selected, which influences the training data and ultimately the operation of the trained model 116.

Model selection 106 can include selecting a statistical model from a set of models. The model selection 106 can choose the type of model, among a set of iterative learning models. The type of model defines, at least in part, hyperparameters that are associated with the model. Hyperparameters are parameters whose value is used to control the learning process. By contrast, the values of other parameters (typically node weights) are derived via training. Hyperparameters are not inferred while fitting the model to the training samples 102.

Model training 110 is the process of fitting the selected model, using the optimized hyperparameters, to the training samples 102. The model training 110, in the example of some ML techniques, can use gradient descent to determine how to adjust weights of the model to better fit the training samples 102. The result of model training is the trained model 116. There are options for model training that include hyperparameter value selection. For example, a learning type, regularization, and constraints of the training 110 each include hyperparameters for which values are to be selected.

Evaluating the trained model 116 can be performed at operation 118. Evaluating the trained model 116 can include operating the trained model based on test data (from validation data 120). The operation 118 can include determining an accuracy, perplexity, latency, or other performance parameter of the model 116.

Hyperparameter selection/optimization can be performed at operation 108. Hyperparameters affect the speed and quality of the learning process. That is, the time required to train and test the model can depend upon the choice of the hyperparameters. Some hyperparameters include size (number of nodes) of a layer, number of layers of nodes, tolerance for errors (e.g., in support vector machine (SVM) type model), degree of polynomial (e.g., in a regression model), learning rate (e.g., in NN models), batch size (e.g., in NN models), momentum, number of clusters (e.g., in a clustering model), number of leaves or depth (e.g., in a tree-structured model), number of latent factors in a matrix factorization, loss function, activation function, number of epochs, dropout rate, distance threshold, n components, among many others. The hyperparameters are higher-level concepts than weights. The hyperparameters regard, for example, model complexity, or capacity to learn. Hyperparameters are not learned directly from the training data in the standard model training process and are predefined before training. Hyperparameters can be decided by setting different hyperparameter values, training different respective models using those hyperparameters, and choosing the hyperparameter values that test better. Embodiments regard how to improve the hyperparameter value selection (at operation 108) in fixed-budget scenarios.

As discussed, embodiments regard hyperparameter selection given a fixed budget. An advantage provided by embodiments includes reducing an amount of time spent testing a given point (an individual set of values for hyperparameters) that is not likely to improve performance. An advantage provided by embodiments includes decoupling performance response from cost response, thereby avoiding potential calibration issues. Embodiments can outperform other fixed-budget approaches in many scenarios.

Figure 2:
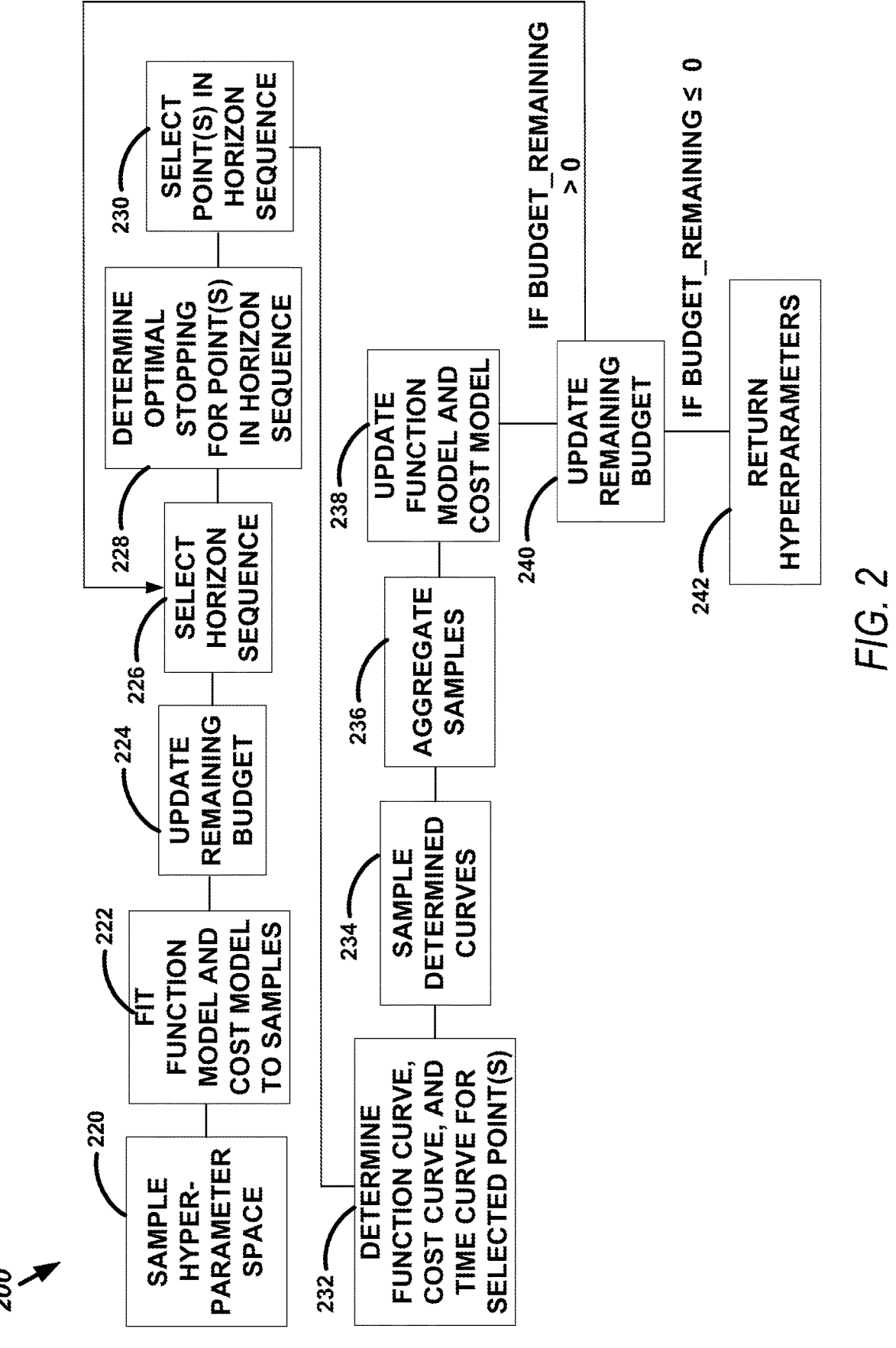
FIG. 2 illustrates, by way of example, a flow diagram of an embodiment of a method for hyperparameter selection.

FIG. 2 illustrates, by way of example, a flow diagram of an embodiment of a method 200 for hyperparameter selection method 200. The method 200 as illustrated includes sampling the hyperparameter space, at operation 220; fitting a function model and cost model to data obtained from operation 220, at operation 222; updating a remaining budget, at operation 224; selecting a horizon sequence (a series of hyperparameter values expected to improve performance), at operation 226; determining an optimal stopping point for point(s) in the selected horizon sequence, at operation 228; selecting one or more points in the horizon sequence for execution, at operation 230; determining a function curve and cost curve, for the selected points from the horizon sequence, at operation 232; sampling the determined curves, at operation 234; aggregating samples, at operation 236; updating the function model and the cost model, at operation 238; updating the remaining budget, at operation 240; and returning hyperparameters, at operation 242. If there is budget remaining (i.e., budget remaining >0) the method 200 can go from operation 240 to operation 226. If there is no budget remaining (i.e., budget remaining: S 0), the method 200 can go from operation 240 to operation 242.

The method 200 can operate using training samples, an objective function, $/$, a maximum number of iterations, tmax, and a total budget, Btotal, for hyperparameter tuning. The operation 220 can include selecting (e.g., randomly, uniformly, of the like), one or more hyperparameter vectors to implement and test. The hyperparameter vector in this context is a vector of hyperparameter values that define an instance of an iterative learning model. The operation 220 can include training the iterative learning model using the hyperparameter values. During training, a value of the objective function, a value of the cost function, and the number of epochs (sometimes called iterations) can be monitored and recorded.

At operation 222, a Gaussian process (GP) model, or other non-parametric Bayesian optimization model, can be fit to the recorded curves. In probability theory and statistics, a Gaussian process is a stochastic process (a collection of random variables indexed by time or space), such that every finite collection of those random variables has a multivariate normal distribution. This means that every finite linear combination of the random variables is normally distributed. The distribution of a Gaussian process is the joint distribution of all those (infinitely many) random variables, and as such, it is a distribution over functions with a continuous domain (e.g., time). The result of operation 222 is a cost model, $GP_c$, that models the cost in the sampled hyperparameter space and a function model, $GP_f$, that models the objective function in the sampled hyperparameter space. These models are used at operation 228 and operation 238.

At operation 224, the budget used at operations 222, 224 is subtracted from $B_{total}$. The result of operation 224 is the remaining budget, $B_{remaining}$.

Operation 226 can include planning a series of hyperparameter vectors to execute. The operation 226 can be performed based on $B_{remaining}$, and $GP_f$. The operation 226 can include identifying a series of points that have the highest expected utility (EI) based on the input maximum number of epochs, $t_{max}$.

Operation 228 can include, estimating, based on $GP_f$ and $t_{max}$, at which iteration the learning of the iterative learning model will improve by less than a specified amount. Put another way, the operation 228 includes estimating at which iteration the next iteration of learning does not sufficiently improve the operation of the iterative learning model. Sufficiently in this instance means less than a specified amount or satisfying another specified criterion. The optimal iteration at which to stop can be estimated by identifying at which iteration the function model indicates that a difference between (1) the objective function evaluated at the hyperparameter point and $t_{max}$, and (2) the objective function evaluated at the optimal iteration stopping point and the hyperparameter point is less than a specified threshold. By estimating an optimal iteration stopping point, $$t_x^{opt},$$

for each point in the selected horizon sequence, $\vec{x}$, the number of training iterations per point in the horizon sequence can be kept less than $t_{max}$. This allows the method 200 to spend less time exploring hyperparameter points that are less likely to improve and more time exploring different hyperparameter points or more hyperparameter points.

Operations 226 and 228 jointly, are sometimes referred to as a "Planning Function". Planning function pseudocode is provided:

```
Planning(GP_f, GP_c, B_remaining)
S={ }
While B_remaining > 0 or BatchStoppingCriteria = true
    x⃗ ← argmax_{x⃗∈X}EI(x⃗, t_max) //select x⃗ based on the highest number of
epochs t_max//
    t_x^opt ← OptimalStopping(x⃗) //find optimal stopping for x
    B_remaining ← B_remaining − GP_c(x⃗, t_x^opt)
    S = S ∪ {(x⃗, t_x^opt)}
Return S
    Optimal Stopping Function pseudocode:
OptimalStopping(x)
//Given GP_f(x, t_max) and ∈, find the smallest t that does not degrade
GP_f(x, t_max)//
t_x^opt ← argmin t s.t. GP_f(x, t_max) − GP_f(x, t) ≤ ∈
//Given the exponential decay assumption over t and the finite nature of t,
this can be solved efficiently using binary search//
Return t_x^opt
```

ε is a defined stopping threshold. For example, if epsilon is set to 5%, then $$t_x^{opt}$$

is estimated as the number of training iterations it takes for the learner to come within 5% of the converged (or "plateau") value.

At operation 230, a subset of the horizon sequence selected at operation 226 is selected. There are a variety of ways in which to select a subset of the horizon sequence. Example selection criterion include: (1) select the point(s) with the highest immediate expected improvement (e.g., improvement in the objective function over current best value of the objective function); (2) select the point(s) with the highest expected improvement per unit cost (e.g., improvement in the objective function considering the budget consumed in gaining the improvement); (3) randomly select a point in the horizon sequence; or the like.

Select Function Pseudocode:

```
//Select point to evaluate or batch in the presence of multiple
workers//
    Select(χ_h): //One or more of several options can be used//
    1) Select the point(s)with highest immediate expected improvement
    2) Select the point(s)with the highest expected improvement per
    unit cost
    3) Select randomly
    Return x, t_x^opt
```

At operation 232, the hyperparameter values of the point(s) selected at operation 230 can be used to train the iterative learning model. The operation 232 can include, similar to operation 220, monitoring and recording function data, cost data, and time data for the points as they are used. The result is a cost curve for the point and a function curve for the point. These curves, or a subset of these curves, can then be used to update the function model, GP_f; and the cost model, GP_c at operation 238. The operation 232 is sometimes called evaluating at the selected points. Since the $$t_x^{opt}$$

is estimated, and the function and cost models are also estimated, it can be beneficial, in terms of compute efficiency and budget consumption, to check the performance of the hyperparameter point while the iterative learning model is being executed using the values of the hyperparameter point. To do this, the operation 232 can be performed before $$t_x^{opt},$$

and a new optimal stopping iteration, $$t_x^{optNew},$$

can be determined. Then, if the expected performance at $$t_x^{optNew}$$

is still sufficiently improving (see Evaluate function pseudocode for example criterion explaining what is meant by sufficient), the hyperparameter point can continue to be used until it is no longer improving sufficiently.

Evaluate Function Pseudocode:

```
Evaluate (f(x⃗, t_x^opt)):
launch the evaluation of x⃗ with t_x^opt iterations
//After p% of t_x^opt, re-evaluate the curve of x⃗ and obtain t_x^optNew //
//If the expected performance at t_x^optNew is still improving, keep running,
else stop//
If GP_now(x, t_x^optNew) ≥ y_best,and Variance_now(x, t_x^optNew)
    ≤ Threshold_var: Continue
    else: Stop
Return y⃗, c⃗, t_x
```

At operation 234, the curves determined at operation 232 can be sampled, such as by using a pruning function. There are many ways to prune, with varying advantages or disadvantages. The pruning function of the method 200 serves to limit the amount of data used in updating the function model, GP_f, and the cost model, GP_c, while retaining the shape of the curve to determine when the iterative learning model is going to plateau. The following pseudocode explains a few ways in which pruning the curves can be performed.

Prune Function Pseudocode:

```
//Select a subset from the curve that is informative//
    Prune(y⃗_curve, c⃗_curve, t_{x_curve}) //one or more of several options can be
used//
    1) Select m points equally spaced along the curve
    2) Select m points with the highest uncertainty given the
condition number threshold
    3) Select m most diverse points with respect to y value
(this can be approximated)
    Return y⃗, c⃗, t_x
```

At operation 236, the function curves, cost curves and corresponding hyperparameter points that have been determined thus far can be aggregated. These function model, GP_f, and the cost model, GP_c, can then be fit to the aggregated points at operation 238. The result of the operation 238 is updated function and cost models. The operation 240 includes subtracting the actual budget consumed (as opposed to an estimated budget consumed see the Planning Function pseudocode to estimating budget consumed using the cost model, GPc) from the budget remaining. In a first iteration of the method 200, the budget remaining is determined by operation 224. In a subsequent iteration of the method 200, the budget remaining is determined by an immediately previous execution of the operation 240. If the budget remaining is positive, the method 200 can continue at operation 226. If the budget remaining is zero or negative, the method 200 can continue at operation 242. At operation 242 the hyperparameters, number of epochs to train using the hyperparameters, and the objective function evaluated based on the hyperparameters and number of epochs can be provided.

Pseudocode of hyperparameter selection in accord with the method 200 is provided:

---

Input: $\chi$; f(x); $t_{max}$; $B_{total}$
Ouput: x*, $t_x^{opt}$, f(x*, $t_x^{opt}$)
Initialize with $N_0$ initial points D ←

$\{(\vec{x}_{N_0}, t_{x_{N_0}}, \vec{y}_0, \vec{c}_0), ... ,(\vec{x}_0, t_{x_0}, \vec{y}_{N_0}, \vec{c}_{N_0})\}$ where $\vec{y}_i$ =
[f($x_i$, 0) ... f($x_i$, $t_{x_i}$)]is a vector of function values and $\vec{c}_i$ =
[c($x_i$, 0) ... c($x_i$, $t_{x_i}$)] is a vector of cost values given by iterations 0 ... $t_{x_i}$
for each $x_i$
  fit the $t_x^{opt}$ function model $GP_f$ and the cost model $GP_c$
  $B_{remaining}$ ← $B_{total}$ − $\Sigma_{i=0}^{N_0}$ c($x_i$, $t_{x_i}$)
  While $B_{remaining}$ > 0
  //Find the budget constrained horizon sequence and corresponding
  optimal stopping//
    $\chi_h$: $(\vec{x}_1, t_{x_1}^{opt},) ... (\vec{x}_h, t_{x_h}^{opt})$ ← Planning($GP_f$, $GP_c$, $B_{remaining}$)
    x, $t_x^{opt}$ ← select($\chi_h$) //multiple points can be selected for parallel
  evaluations//
    $\vec{y}_{curve}, \vec{c}_{curve}, t_{x_{curve}}$ ← Evaluate(f($\vec{x}, t_x^{opt}$)) //might stop before
  $t_x^{opt}$//
    $\vec{y}, \vec{c}, t_x$ ← Prune($\vec{y}_{curve}, \vec{c}_{curve}, t_{x_{curve}}$) //keep subset of points from
  each curve//
    Aggregate Data: D ← D ∪ $\{(\vec{x}, t_x, \vec{y}, \vec{c})\}$
    Update Models: $GP_f$, $GP_C$
    $B_{remaining}$ ← $B_{remaining}$ − c(x, $t_x$)
    Return x*, $t_x^{opt}$, f(x*, $t_x^{opt}$)

---

In the hyperparameter selection pseudocode x* is the hyperparameter values that optimize the objective (result in the best y, $y_{best}$).

An alternative planning function that can be used if determining $$t_x^{opt}$$

is computationally cheap and can be included in EI optimization over a continuous domain is provided. Alternative planning function pseudocode:

---

Alternative Planning($GP_f$, $GP_c$, $B_{remaining}$)
  S={ }
  While $B_{remaining}$ > 0 or BatchstoppingCriteria = true
    $\vec{x}, t_x^{opt}$ ← argmax$_{\vec{x} \in \chi}$EI($\vec{x}, t_x^{opt}$) //select $\vec{x}$ based on its
  corresponding optimal stopping $t_x^{opt}$ s.t. $GP_c$(x, $t_x^{opt}$) <
    $B_{remaining}$//$B_{remaining}$ ← $B_{remaining}$ − $GP_c$(x, $t_x^{opt}$)
    S = S ∪ $\{(x, t_x^{opt})\}$
    Return S

---

The method 200 extends BINOCULARS (Jiang, S., Chai, H., Gonzalez, J., and Garnett, R. (2020). Binoculars for efficient, nonmyopic sequential experimental design. In International Conference on Machine Learning, pages 4794-4803. PMLR.) to a budget-aware method in the context of iterative hyperparameter optimization. BINOCULARS uses the q-EI proposed in Wang, Jialei, et al. "Parallel Bayesian global optimization of expensive functions." arXiv preprint arXiv:1602.05149 (2016). Maximizing acquisition functions for Bayesian optimization. Conference on Neural Information Processing Systems (NeurIPS 2018)) with a joint batch section. However, this approach requires the batch size to be fixed in advance. In order to modify q-EI to an adaptive batch size with the budget as a stopping criterion, the reparametrized iterative greedy q-EI proposed in Wilson et al. (2018) can be used. Using the submodularity characteristic of EI, the iterative greedy approach was shown Wilson et al. (2018) to be theoretically equivalent to the joint approach and perform better when d×q is large.

The standard practice of normalizing the acquisition function by a (predictive) cost model tends to bias the search towards selecting only very cheap and non-informative points. Another issue is that in iterative learning, the cost will always be estimated with respect to the evaluation point. However, if the configuration has been already evaluated for some iterations, the cost should only reflect the additional iterations. This is naturally handled in the planning framework provided by the method 200.

Extensions to the method 200 include parallel evaluations and multiple objectives (via e.g., the q-EHI acquisition function) which have not been previously considered in the context of non-myopic Bayesian optimization. A look-ahead stopping criterion can increase computational efficiency (as described regarding the Evaluate function of the method 200). Several recent works discussed that due the model uncertainty, querying a long horizon can bring more disadvantages than advantages to the process (evaluating misleading points, higher computational cost, etc.). A recent work that proposed a way to determine the horizon length in lookahead methods based on rollout. Early stopping is another complementary idea that can help preserve the budget in case the point in evaluation does not show the expected promising performance. This is also provided by the Evaluate function.

An iterative learning scenario with a freeze/thaw model (see Swersky, K., Snoek, J., and Adams, R. P. (2014). Freeze-thaw Bayesian optimization. arXiv preprint arXiv: 1406.3896) was implemented. This generative model places a standard GP prior over learning curve asymptotes and draws the learning curves themselves independently from another GP prior with exponential decay kernel. The hyperparameter domain has three dimensions in this experiment: learning rate in [$10^{-5}$, 1], regularization weight in [$10^{-5}$; 1], and batch size in [$2^5$; $2^{13}$]. The (training) time dimension represents number of epochs in [1; 500]. Cost is computed as time (in unit coordinates) multiplied by a scale factor which is equal to the requested batch size dived by optimal batch size which is pre-defined as $2^{10}$. Similarly, when evaluating the "objective function" for a certain amount of training time, the evaluation is conducted at the requested training time multiplied by the scale factor. In other words, using a larger batch size than the optimally defined one provides quicker convergence in terms of training iterations, but at a higher cost, and vice versa. Learning curves drawn from this model are provided in FIG. 3.

Figure 3:
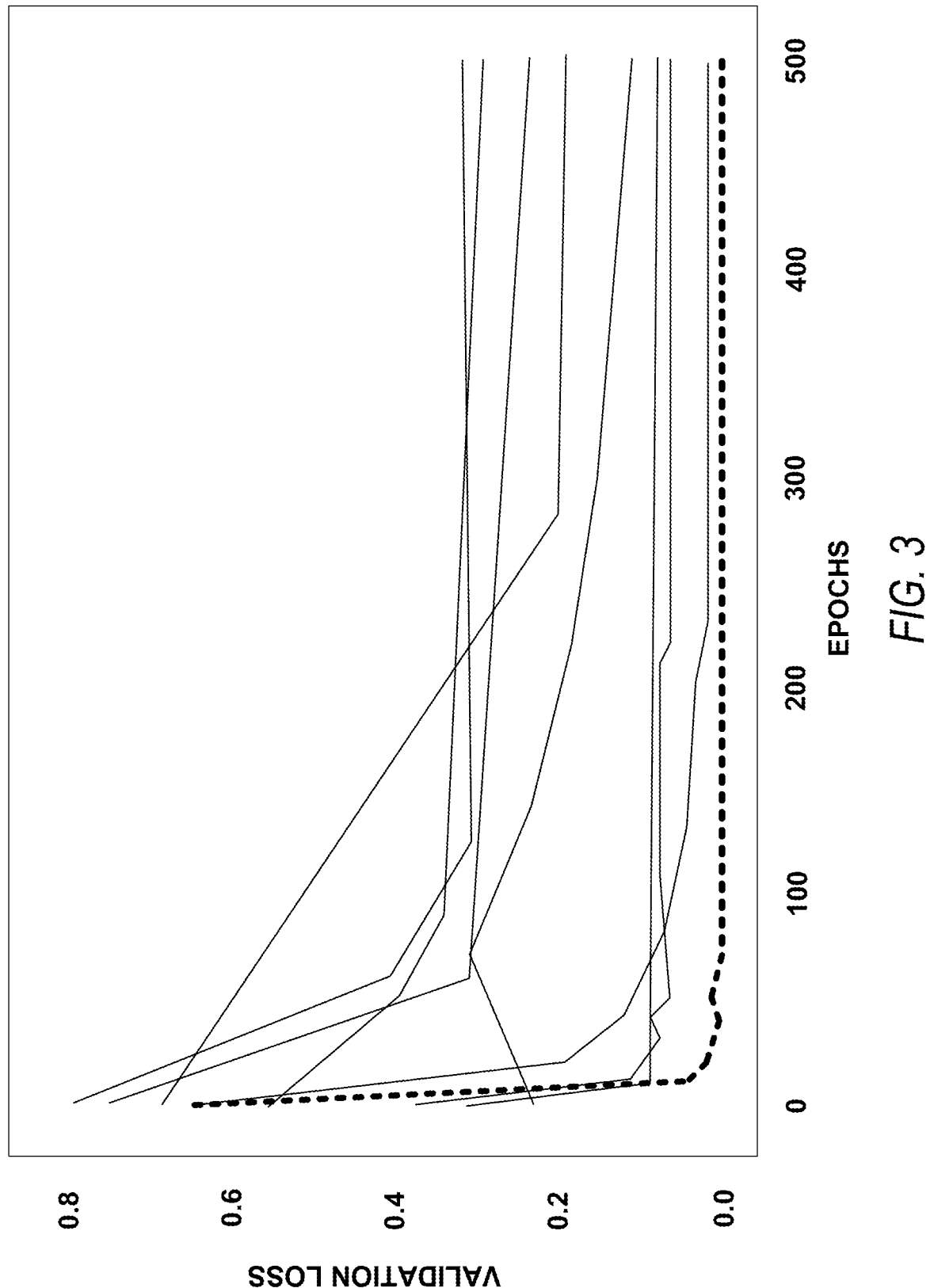
FIG. 3 illustrates, by way of example, a graph of simulated learning curves generated in accord with a freeze/thaw model.

FIG. 3 illustrates, by way of example, a graph of learning curves generated in accord with a freeze/thaw model. An example freeze/thaw model is described in Swersky, K., Snoek, J., & Adams, R. P. (2014). Freeze-thaw Bayesian optimization. arXiv preprint arXiv:1406.3896. A goal of the method 200 is to identify and provide the hyperparameters associated with the best learning curve (the global best is provided in heavy dashed lines in FIG. 3) given the budget and objective. As can be seen in FIG. 3, each of the learning curves tends to decrease in learning, and then plateau. The method 200 can estimate the plateau, $$t_x^{opt},$$

using the function model, $GP_f$ evaluated at $t_{max}$ and the current t. This allows the hyperparameter search to reduce the time training using a hyperparameter configuration that is unlikely to improve much more. The method 200 operation is compared to some other budget-aware hyperparameter optimization techniques in FIG. 4.

Figure 4:
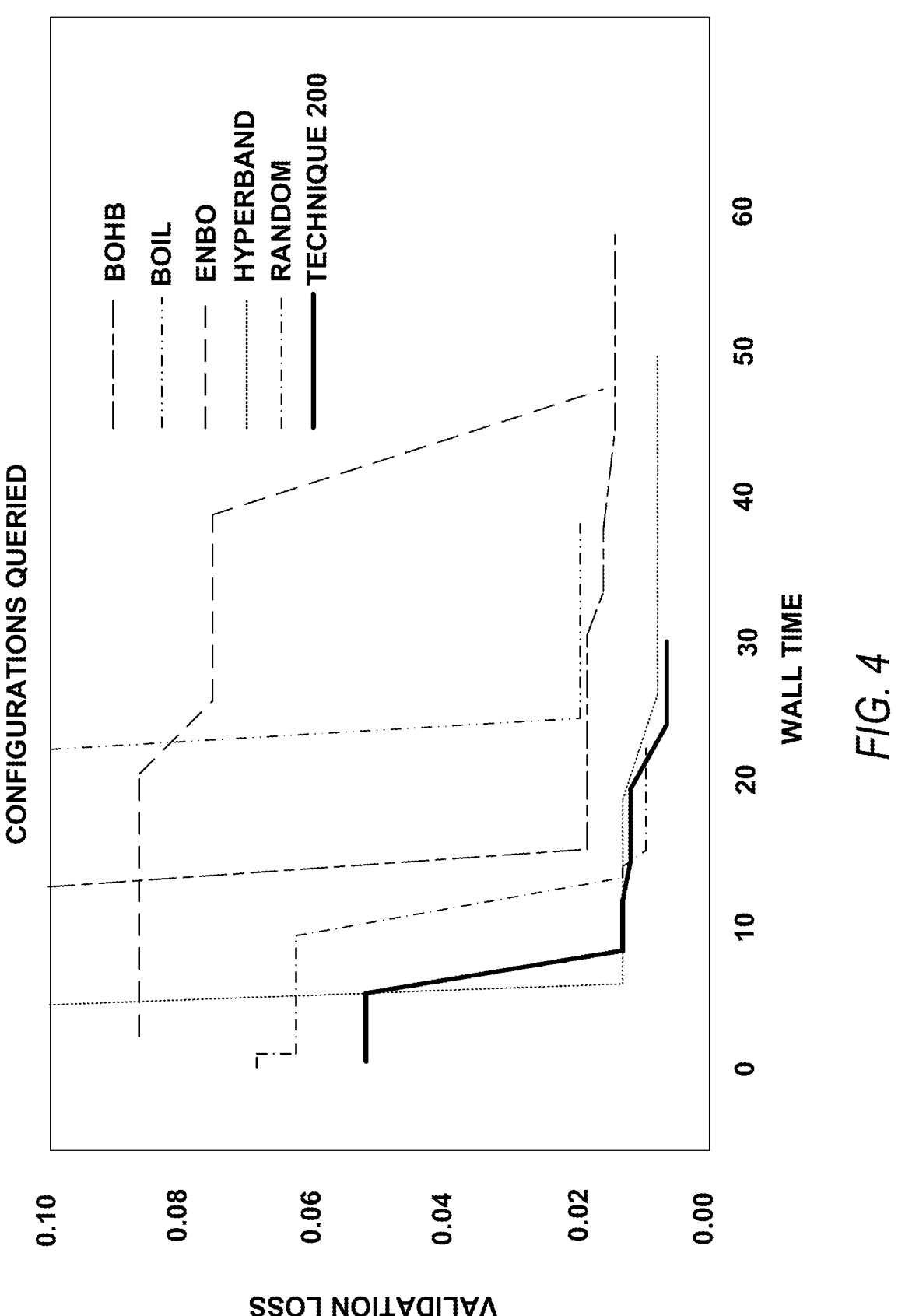
FIG. 4 illustrates, by way of example, a graph of validation loss versus wall time for a variety of non-budget-aware and budget-aware hyperparameter optimization techniques.

FIG. 4 illustrates, by way of example, a graph of validation loss versus wall time for a variety of budget-aware hyperparameter optimization techniques. The graph includes Bayesian optimization and HyperBand (BOHB) (see Falkner, S., Klein, A., and Hutter, F. (2018). Bohb: Robust and efficient hyperparameter optimization at scale. In International Conference on Machine Learning, pages 1437-1446. PMLR); Bayesian optimization for iterative learning (BOIL) (see Nguyen, V., Schulze, S., and Osborne, M. A. (2019). Bayesian optimization for iterative learning. arXiv preprint arXiv:1909.09593); HyperBand (see Li, L., Jamieson, K., DeSalvo, G., Rostamizadeh, A., and Talwalkar, A. (2017). Hyperband: A novel bandit-based approach to hyperparameter optimization. The Journal of Machine Learning Research, 18(1):6765-6816), and random search, all with default settings. The graph further includes the proposed method 200. The method 200 performance is presented in the thick, solid line. The comparison metric is performance/cost where performance is defined as simulated loss on a validation set and cost is simulated wall time. The method 200 performs better than the other iterative Bayesian optimization-based approaches BOHB and BOIL as well as an explicit lookahead approach ENBO. The method 200 is comparable with HyperBand and random search in this scenario in terms of performance/cost; however, it is not expected that random search will scale well to higher-dimensions with respect to performance/cost, and it is well-known that HyperBand does not perform intelligent search and can thereby waste time in more expensive scenarios.

Since FIG. 4 only compares with respect to the final learning curve value, it is instructive to inspect the associated learning curve and candidate curves that were queried by each of the methods. The learning curve profile of the method 200, while technically slightly worse in final performance in the experiment, is clearly best overall in providing low loss throughout the simulated training.

Figure 5:
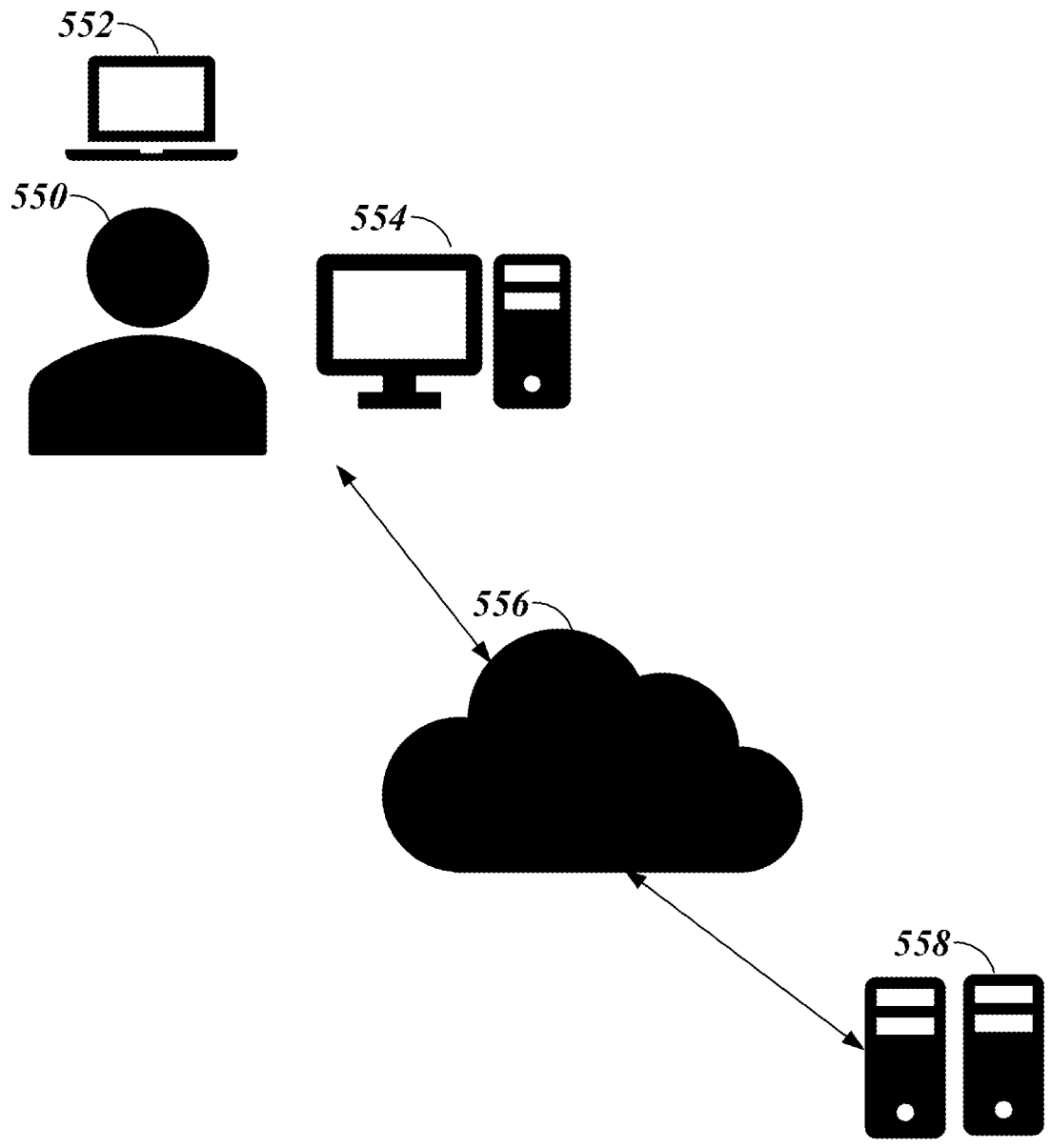
FIG. 5 illustrates, by way of example, a conceptual block diagram explaining use cases of embodiments.

FIG. 5 illustrates, by way of example, a diagram of embodiments of use-cases for the method 200 of FIG. 2. FIG. 5 illustrates a user 550 with a need or desire to generate a model that operates on a user device 552, 554 to classify data. The data can be audio, visual, textual, or the like. The classification can include an utterance, an object type, an alpha-numeric character or symbol, or the like. The model is an iterative learning model, such as a neural network (NN) (e.g., a convolutional NN, recurrent NN, Boltzmann machine, deep NN, memory network, or the like), a decision tree, reinforcement learning model, or the like. The user has a need to generate the model within a specified timeframe (a budget) and with specified resources (further budget constraints). The user knows about how many training iterations can be performed in the specified timeframe with their resources. However, the user 550 does no know which hyperparameters to use in executing the training of their model.

The user 550 can connect to a remote service, provided by servers 558 and accessed through cloud 556, or can execute the method 200 locally on the user device 552, 554. The method 200 can provide data to the user 550 (by the device 552, 554) that indicates a number of training iterations (less than or equal to a maximum number of training iterations indicated by the user 550) to achieve near optimal performance, and the hyperparameter values to use to achieve the near optimal performance (given the constraints provided by the user).

Figure 6:
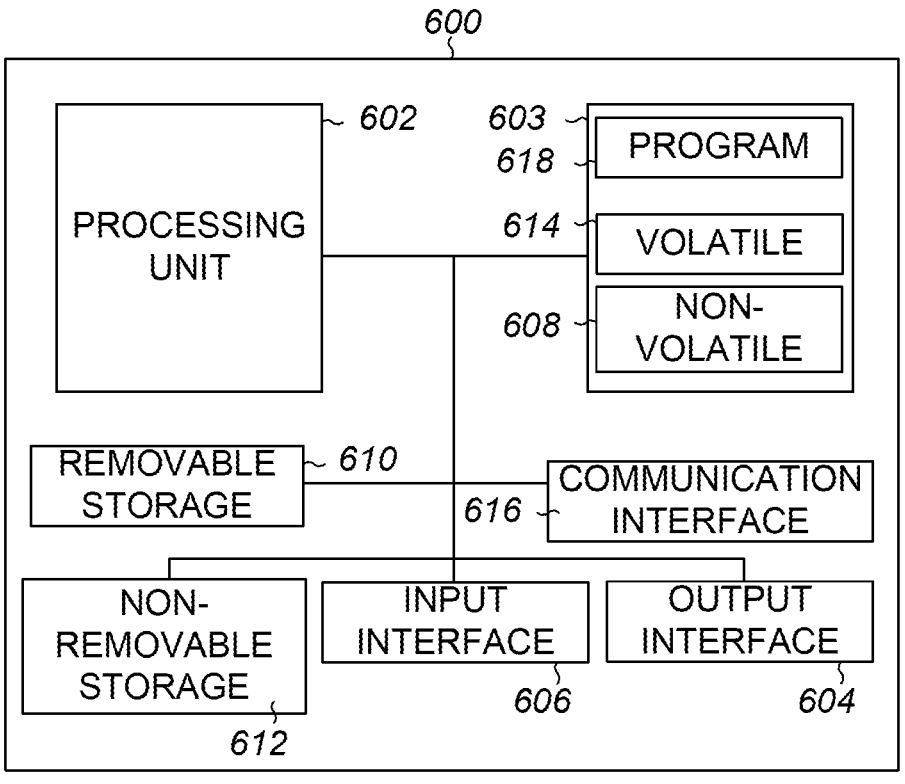
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. The machine 600 can implement a technique for improved contextual data provisioning in a conference. The device 552, 554, server 558, or a component thereof can include one or more of the components of the machine 600. One or more of the techniques 100 and 200, device 552, 554, server 558, or a component or operations thereof can be implemented, at least in part, using a component of the machine 600. One example machine 600 (in the form of a computer), may include a processing unit 602, memory 603, removable storage 610, and non-removable storage 612. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include— or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 602 (sometimes called processing circuitry) of the machine 600. A hard drive, CD-ROM, and RAM are some examples of articles including a non-transitory computer-readable medium such as a storage device. For example, a computer program 618 may be used to cause processing unit 602 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

Additional Notes and Examples

Example 1 can include a method for providing budget-constrained hyperparameter values for an iterative learning model, the method comprising receiving, by a compute device, data indicating a type of iterative learning model, training samples, an objective function, a maximum number of iterations, and a budget, while training a model of the type for a number of iterations using respective values of a hyperparameter vector, recording objective function values of the objective function and cost function values of a cost function, the hyperparameter vector including a hyperparameter value for each hyperparameter, fitting a function model to the objective function values and a cost model to the cost function values resulting in a fitted function model and a fitted cost model, selecting a second hyperparameter vector based on the fitted cost model, the fitted function model, and the budget, determining, based on the fitted function model and the maximum number of iterations, an optimal number of iterations to perform and after which to stop training using the second hyperparameter vector, re-training the model of the type of model for the optimal number of iterations using the second hyperparameter vector, and providing hyperparameter values, of the hyperparameter vector or the second hyperparameter vector, that maximize an objective defined by the objective function.

In Example 2, Example 1 can further include while training the model for the optimal number of iterations using the second hyperparameter vector, updating the optimal number of iterations based on the recorded objective function values and the recorded cost function values.

In Example 3, Example 2 can further include comparing a current objective function value provided by evaluating the objective function model at (i) the second hyperparameter and (ii) the updated optimal number of iterations to a current best value for the objective function, and stopping the training if the current objective function value is less than the current best value or continuing training with more iterations if the current objective function value is greater than (or equal to) the current best value.

In Example 4, at least one of Examples 1-3 can further include, wherein determining optimal number of iterations includes find a minimum number of iterations at which a difference between (i) the fitted function model evaluated at the second hyperparameter vector and the maximum number of iterations and (ii) the fitted function model at the second hyperparameter vector and a number of iterations is less than a specified threshold value.

In Example 5, at least one of Examples 1-4 can further include, wherein selecting the second hyperparameter vector includes determining, based on the maximum number of iterations, an expected utility of hyperparameters in a neighborhood of the hyperparameter vector in hyperparameter space, and providing a hyperparameter vector corresponding to a highest expected utility as the second hyperparameter vector.

In Example 6, at least one of Examples 1-5 can further include selecting a sequence of hyperparameter vectors, wherein selecting the second hyperparameter vector is part of selecting the sequence of hyperparameter vectors, and selecting the second hyperparameter vector of the sequence of hyperparameter vectors based on determining the second hyperparameter vector (i) has a highest expected immediate reward for evaluating the hyperparameter vector, (ii) has a highest reward per unit cost for evaluating the hyperparameter vector, or (iii) is a randomly selected hyperparameter vector.

In Example 7, at least one of Examples 1-6 can further include, before fitting a function model to the objective function values and a cost model to the cost function values resulting in a fitted function model and a fitted cost model, pruning the objective function values and the cost function values by one of (i) selecting equally spaced points, (ii) selecting points with highest uncertainty, or (iii) selecting points for which the difference between the objective function evaluated at those points is greatest.

Example 8 includes processing circuitry and a memory including instructions that, when executed by the processing circuitry, cause the processing circuitry to perform operations for providing budget-constrained hyperparameter values for an iterative learning model, the operations comprising the method of one of Examples 1-7.

Example 9 includes a non-transitory machine-readable medium including instructions that, when executed by a machine, cause the machine to perform for providing budget-constrained hyperparameter values for an iterative learning model, the operations comprising the method of one of Examples 1-7.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method for providing budget-constrained hyperparameter values for an iterative learning model, the method comprising:

receiving, by a compute device and from a user, data indicating a type of iterative learning model, training samples, an objective function, a maximum number of iterations, and a budget for training the model;

sampling a hyperparameter space of the iterative learning model resulting in hyperparameter space samples and selecting a first hyperparameter vector from the hyperparameter space samples;

while training a model of the type for a number of iterations using respective values of the first hyperparameter vector, recording objective function values of the objective function and cost function values of a cost function, the first hyperparameter vector including a hyperparameter value for each hyperparameter;

fitting a function model to the objective function values and a cost model to the cost function values resulting in a fitted function model and a fitted cost model;

updating a remaining budget based on budget used in training the iterative learning model and the budget for training the model;

selecting, from the hyperparameter space samples and based on the remaining budget, the fitted cost model and the fitted function model, a series of hyperparameter values to use in training the iterative learning model by selecting the hyperparameters of the hyperparameter space samples that have highest expected improvements in the objective function of a current best value of the objective function considering the maximum number of iterations;

forecasting, for each of the hyperparameters of the series of hyperparameter values and based on the fitted function model and the maximum number of iterations, an optimal number of iterations of training to perform and after which to stop training by identifying at which iteration the fitted function model indicates that a difference between (i) the objective function evaluated at the hyperparameter of the series of hyperparameters and the maximum number of iterations and (ii) the objective function evaluated at the hyperparameter of the series of hyperparameters and the iteration is less than a specified threshold;

selecting a second hyperparameter of the series of hyperparameter values that has a highest expected improvement in the objective function over the current best value of the objective function;

after forecasting and selecting the second hyperparameter and while training the model of the type for the optimal number of iterations using the second hyperparameter vector:

updating the optimal number of iterations based on the recorded objective function values and the recorded cost function values; and stopping the training if a current objective function value is less than the current best value or continuing with more iterations if the current objective function value is greater than (or equal to) the current best value; and providing hyperparameter values, of the series of hyperparameter vectors, that maximizes an objective defined by the objective function; and training the model of the type using the provided hyperparameter values resulting in a trained model.

2. The method of claim 1, further comprising, before fitting the function model to the objective function values and the cost model to the cost function values resulting in the fitted function model and the fitted cost model, pruning the objective function values and the cost function values by one of (i) selecting equally spaced points, (ii) selecting points with highest uncertainty, or (iii) selecting points for which a difference between the objective function evaluated at those points is greatest.

3. A system comprising:

processing circuitry; and a memory including instructions that, when executed by the processing circuitry, cause the processing circuitry to perform operations for providing budget-constrained hyperparameter values for an iterative learning model, the operations comprising:

receiving, from a user, data indicating a type of iterative learning model, training samples, an objective function, a maximum number of iterations, and a budget for training the model;

sampling a hyperparameter space of the iterative learning model resulting in hyperparameter space samples and selecting a first hyperparameter vector from the hyperparameter space samples;

while training a model of the type for a number of iterations using respective values of the first hyperparameter vector, recording objective function values of the objective function and cost function values of a cost function, the first hyperparameter vector including a hyperparameter value for each hyperparameter;

fitting a function model to the objective function values and a cost model to the cost function values resulting in a fitted function model and a fitted cost model;

updating a remaining budget based on budget used in training the iterative learning model and the budget for training the model;

selecting, from the hyperparameter space samples and based on the remaining budget, the fitted cost model and the fitted function model, a series of hyperparameter values to use in training the iterative learning model by selecting the hyperparameters of the hyperparameter space samples that have highest expected improvements in the objective function of a current best value of the objective function considering the maximum number of iterations;

forecasting, for each of the hyperparameters of the series of hyperparameter values and based on the fitted function model and the maximum number of iterations, an optimal number of iterations of training to perform and after which to stop training by identifying at which iteration the fitted function model indicates that a difference between (i) the objective function evaluated at the hyperparameter of the series of hyperparameters and the maximum number of iterations and (ii) the objective function evaluated at the hyperparameter of the series of hyperparameters and the iteration is less than a specified threshold;

selecting a second hyperparameter of the series of hyperparameter values that has a highest expected improvement in the objective function over the current best value of the objective function;

after the forecasting and the selecting the second hyperparameter and while training the model of the type for the optimal number of iterations using the second hyperparameter vector:

updating the optimal number of iterations based on the recorded objective function values and the recorded cost function values; and stopping the training if a current objective function value is less than the current best value or continuing with more iterations if the current objective function value is greater than (or equal to) the current best value; and providing hyperparameter values, of the series of hyperparameter vectors, that maximizes an objective defined by the objective function; and training the model of the type using the provided hyperparameter values resulting in a trained model.

4. The system of claim 3, wherein the operations further comprise, before fitting the function model to the objective function values and the cost model to the cost function values resulting in the fitted function model and the fitted cost model, pruning the objective function values and the cost function values by one of (i) selecting equally spaced points, (ii) selecting points with highest uncertainty, or (iii) selecting points for which a difference between the objective function evaluated at those points is greatest.

5. A non-transitory machine-readable medium including instructions that, when executed by a machine, cause the machine to perform operations for providing budget-constrained hyperparameter values for an iterative learning model, the operations comprising:

receiving, from a user, data indicating a type of iterative learning model, training samples, an objective function, a maximum number of iterations, and a budget for training the model;

sampling a hyperparameter space of the iterative learning model resulting in hyperparameter space samples and selecting a first hyperparameter vector from the hyperparameter space samples;

while training a model of the type for a number of iterations using respective values of the first hyperparameter vector, recording objective function values of the objective function and cost function values of a cost function, the first hyperparameter vector including a hyperparameter value for each hyperparameter;

fitting a function model to the objective function values and a cost model to the cost function values resulting in a fitted function model and a fitted cost model;

updating a remaining budget based on budget used in training the iterative learning model and the budget for training the model;

selecting, from the hyperparameter space samples and based on the remaining budget, the fitted cost model and the fitted function model, a series of hyperparameter values to use in training the iterative learning model by selecting the hyperparameters of the hyperparameter space samples that have highest expected improvements in the objective function of a current best value of the objective function considering the maximum number of iterations;

forecasting, for each of the hyperparameters of the series of hyperparameter values and based on the fitted function model and the maximum number of iterations, an optimal number of iterations of training to perform and after which to stop training by identifying at which iteration the fitted function model indicates that a difference between (i) the objective function evaluated at the hyperparameter of the series of hyperparameters and the maximum number of iterations and (ii) the objective function evaluated at the hyperparameter of the series of hyperparameters and the iteration is less than a specified threshold;

selecting a second hyperparameter of the series of hyperparameter values that has a highest expected improvement in the objective function over the current best value of the objective function;

after the forecasting and the selecting the second hyperparameter and while training the model of the type for the optimal number of iterations using the second hyperparameter vector:

updating the optimal number of iterations based on the recorded objective function values and the recorded cost function values; and stopping the training if a current objective function value is less than the current best value or continuing with more iterations if the current objective function value is greater than (or equal to) the current best value; and providing hyperparameter values, of the series of hyperparameter vectors, that maximize an objective defined by the objective function; and training the model of the type using the provided hyperparameter values resulting in a trained model.

* * * * *